US009224095B2

(12) United States Patent
Booth et al.

(10) Patent No.: US 9,224,095 B2
(45) Date of Patent: Dec. 29, 2015

(54) SYSTEM AND METHODS FOR GENERATING OPTIMAL POST TIMES FOR SOCIAL NETWORKING SITES

(71) Applicants:Joel Alexander Booth, Chicago, IL (US); Justyn Howard, Chicago, IL (US); Aaron Rankin, Chicago, IL (US)

(72) Inventors: Joel Alexander Booth, Chicago, IL (US); Justyn Howard, Chicago, IL (US); Aaron Rankin, Chicago, IL (US)

(73) Assignee: Sprout Social Inc., Chicago, IL (US)

( * ) Notice: Subject to any disclaimer, the term of this patent is extended or adjusted under 35 U.S.C. 154(b) by 180 days.

(21) Appl. No.: 13/840,457

(22) Filed: Mar. 15, 2013

(65) Prior Publication Data

US 2013/0275348 A1 Oct. 17, 2013

Related U.S. Application Data

(60) Provisional application No. 61/623,960, filed on Apr. 13, 2012.

(51) Int. Cl.
*G06N 5/02* (2006.01)
*G06Q 30/02* (2012.01)
*G06Q 50/00* (2012.01)

(52) U.S. Cl.
CPC .................. *G06N 5/02* (2013.01); *G06Q 30/02* (2013.01); *G06Q 50/01* (2013.01)

(58) Field of Classification Search
CPC ........................................................ G06N 5/02
See application file for complete search history.

(56) References Cited

U.S. PATENT DOCUMENTS

| 2009/0281851 A1* | 11/2009 | Newton et al. .................... 705/7 |
| 2011/0282943 A1* | 11/2011 | Anderson et al. ............. 709/204 |
| 2011/0307464 A1* | 12/2011 | Ghosh ........................... 707/706 |
| 2013/0055128 A1* | 2/2013 | Muti et al. .................... 715/769 |

* cited by examiner

*Primary Examiner* — Alan Chen
(74) *Attorney, Agent, or Firm* — Jeffrey A. Pine; Dykema Gossett PLLC

(57) ABSTRACT

A system and methods are disclosed for determining the ideal times for a person, software client, or other entity to post a message to a social networking site. An ideal time is a time when the post will have a maximum impact, where impact is some measure of success as defined by the posting entity. To determine the ideal times, the posting patterns of individual users are aggregated in a weighted fashion, taking into consideration both the entity's desired impact and the likelihood that the user will be online and able to view the post within a specified time frame.

4 Claims, 2 Drawing Sheets

SYSTEM AND METHODS FOR GENERATING OPTIMAL POST TIMES FOR SOCIAL NETWORKING SITES

FIELD OF THE INVENTION

The present invention relates generally to services that allow businesses to efficiently utilize social media channels and, more specifically, to a system and methods for allowing a business to optimize its posting times, or the optimal time to post information to social networking sites, thereby increasing the chance said posts will be received and viewed.

BACKGROUND OF THE INVENTION

Due to the increasing use of social networking sites for both personal and corporate communication, there is an increasing demand that individuals, companies, or their representatives make efficient use of these social networking communication channels. One of the primary uses of these networks is the dissemination of information to a broad audience. The audience includes the individuals, also on the same social networking site, who are actively reading to or otherwise consuming the messages sent by the disseminating party. The audience may also include those not actively pursuing the disseminated content, but who may be interested in it if they were to receive it. For ease of explanation, the disseminating party will hereafter be referred to as a "user" and the audience members will hereafter be referred to as "followers."

One of the primary difficulties a user has in reaching his or her followers is determining the optimal or best time to post a message. In general, these messages are not sent to each follower, but rather are broadcast so that anyone on the social networking site may see them. Each follower may have a personal feed of messages with which he or she is presented. The feed may be a queue of messages broadcast by the people the individual is following as well as any messages directed specifically to the individual. Due to the high rate at which messages are posted to these social networking sites, an individual's feed may grow very rapidly. These messages are posted both while the individual is online at that particular site (or another site) and also while the individual is offline. In order to increase the probability of an individual seeing a message, one should post the message while the individual is online.

Existing post time suggestion systems base their suggestions on a number of erroneous assumptions. First, many assume that all individuals utilizing social networks follow similar usage patterns. While it is true there are some similarities (e.g., posting activity is the lowest in the middle of the night), there are significant differences in the overall posting patterns of different groups. The second erroneous strategy is to suggest post times based on when followers direct a post to other individuals or rebroadcast a post to their own followers. These post times are very tightly correlated with when the individual posts. Therefore, using these post times captures the posting pattern of the individual posting rather than his or her followers.

Thus, there is a long felt need in the field of social networking and the related posting for social networking for a system and methods that suggest ideal times to post messages to social networks such that the messages will have a maximum impact, as defined by the user, or the user's followers.

SUMMARY OF THE INVENTION

The present disclosure provides a system and methods for determining and suggesting ideal times to post messages to social networks. The system and method may use intelligent algorithms that perform weighted aggregation of individual post time patterns in a manner that optimizes an arbitrary metric defining the successfulness of the post. The ideal post time suggestion system and method overcome the limitation of previous systems by not only capturing the actual posting patterns of followers, but also intelligently aggregating them based on an arbitrarily complex user-defined scoring metric to ensure maximum impact for the post.

In one embodiment, the system may collect from a social networking site data indicative of times when followers of a user are posting to the social networking site. The system may also acquire attributes of the followers from one or more social importance ranking services. According to various interests of the user and these attributes of the followers, the system may compute and assign a score to each of the user's followers. For example, a follower of the user that has a large number of his or her own followers may be assigned a high score. This follower may deserve a high score because he or she has considerable influence on others, as shown by the large number of followers. Another follower with very few followers, on the other hand, may receive a much lower score. The system later uses the score associated with each of the user's followers when generating a list of ideal post times.

Based on the data from the social networking site, the system may generate histograms that show when each follower has posted to the social networking site during a given period of time. From the histograms, the system may generate activity models for each follower that show periods of time when a follower is online and likely to see a post in his or her news feed.

The system may weight the activity model of each follower based on the score assigned to that follower. Further, the system may aggregate the weighted activity models into a single activity model that shows when the followers of the user are most likely to see a post from the user. Due to the aggregation and weighting, a follower with a high score will have more impact on the aggregated activity model than a follower with a low score. Still further, the system may use a smoothing algorithm to account for meager amounts of data related to follower activity, the relatively few amount of posts per minute, and the very fine resolution of an activity model. The output of the system may be a list of the most ideal times to post a message or an aggregated activity model, for example.

In still another embodiment, the present disclosure contemplates a method of generating ideal post suggestion times. The method contemplates many if not all of the same processes that the system performs in the course of generating the ideal post times.

In yet another embodiment, a service is provided for individuals or businesses that wish to optimize the times of its posts in order to more effectively and efficiently perform passive and active marketing activities, public relations activities, customer support, sales, media operations, and publishing activities, for example, using existing social media channels, i.e., TWITTER, FACEBOOK, LINKEDIN, FOURSQUARE, etc. The service can be accessed using an Internet browser or through applications written for cellular phone or tablet networks, such as the IPHONE and Android mobile platforms.

Along with providing the posting optimization, the service can provide reporting of activities in the afore-mentioned social media accounts using various metrics such as GOOGLE ANALYTICS, over arbitrary time periods. The service can provide the ability to view these reports in the application, on a website, or export them to PDF or CSV or other presentation and data storage formats.

In another embodiment, a user can input content for use with an automated sending feature, and the service could post the content, one message at a time, during the ideal times.

BRIEF DESCRIPTION OF THE DRAWINGS

The preferred embodiments of the invention will be described in conjunction with the appended drawings, which illustrate and do not limit the invention, where like designations denote like elements, and in which.

DETAILED DESCRIPTION OF EMBODIMENTS OF THE INVENTION

The disclosed system is multi-faceted and operates with a wide variety of social media channels. In general, the system can report activity in social media accounts over arbitrary time periods. The system also reports proprietary demographic metrics about social media audiences. The system offers users a consolidated inbox for all social media activity and provides users with a locations dashboard that tracks activity at physical store locations. Further, the system offers lead generation tools that allow users to track people mentioning certain keywords.

Figure 1:
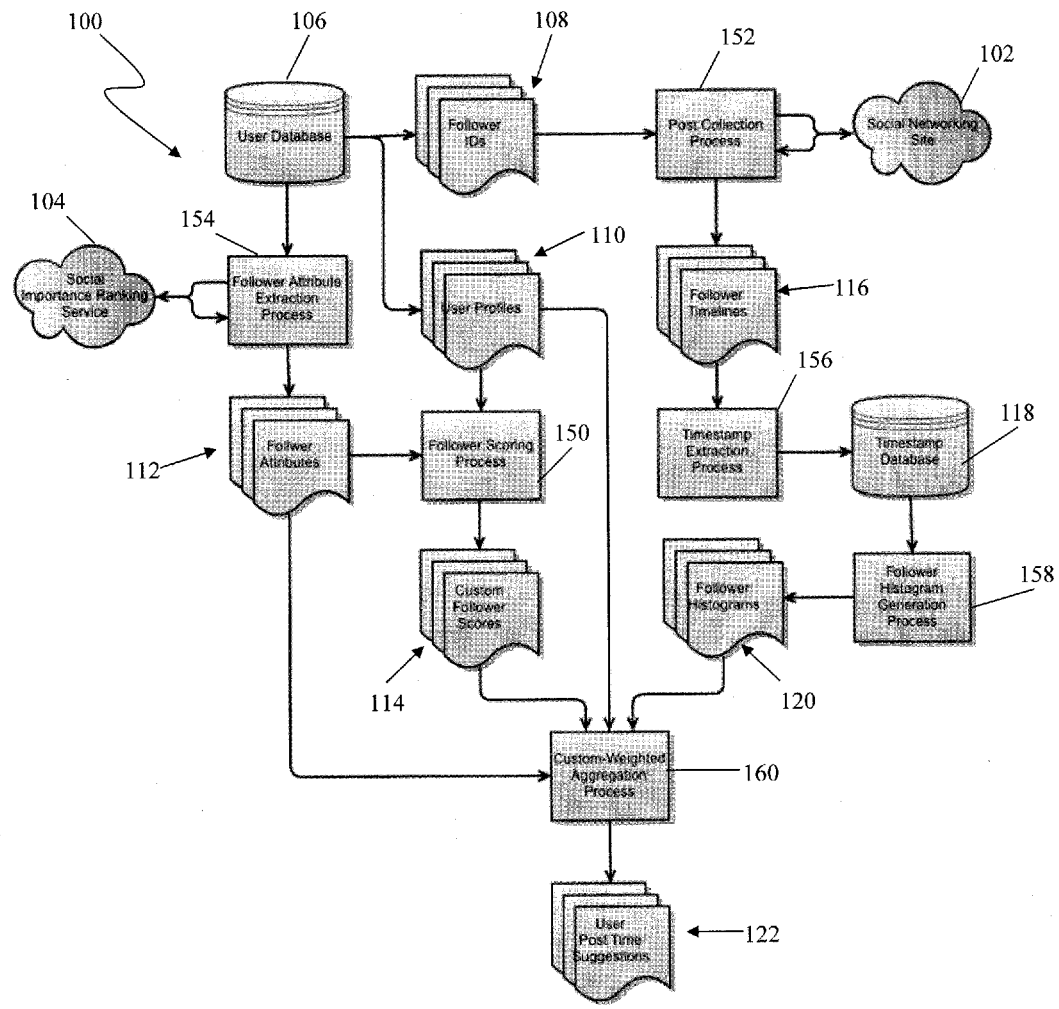
FIG. 1 is a schematic illustration of the ideal post time suggestion system architecture.

More specifically, FIG. 1 shows a schematic illustration of one possible embodiment of a system 100 for generating ideal post time suggestions. As described herein, the scope of the disclosure shall not be limited to the embodiment disclosed herein. Each piece or set of data used with the ideal post time suggestion system 100 will be described before proceeding to a description of the processes that the system 100 performs.

The system 100 may utilize various types of external resources. In the embodiment shown in FIG. 1, the system may utilize up to two types of external resources, namely, a social networking site 102 and a social importance ranking service 104. The social networking site 102 may be a site on which both the user and its followers are active. One non-limiting example of such a social networking site 102 is TWITTER. The site 102 may provide access to both user and follower information. This information may include, for example, the posts and the times at which they were made. The available sequence of posts and their associated times, i.e., timestamps, for a specific individual is known as a timeline.

The social importance ranking service 104 may be, for example only, a website or other type of resource that provides a measure of an individual's importance on the social networking site 102. This social importance ranking service 104 is not necessarily a service provided by the social network 102, but can be a service provided by some external entity that provides some arbitrary measure of influence. In other embodiments, however, the social importance ranking service 104 may be a component of the ideal post time suggestion system 100. For ease of explanation, the social importance ranking service 104 will be characterized as an external resource. Likewise, the social importance ranking service 104 may actually involve more than one social importance ranking service, even though it is referred to in the singular.

The ideal post time suggestion system 100 may generate, acquire, store, and/or manipulate a variety of types of data. For example, the system 100 may involve a user database 106, follower identifiers (IDs) 108, user profiles 110, follower attributes 112, custom follower scores 114, follower timelines 116, a timestamp database 118, follower histograms 120, and user post time suggestions 122.

The user database 106 may be the primary repository of data for the user. The user database 106 may include information about the users, their followers, and general business information. The follower IDs 108 may be extracted from the user database 106. The follower IDs 108 may be unique identifiers for each follower on the social networking site 102. In some embodiments, the system 100 may use all of the follower IDs 108 present in the user database 106. In other embodiments, however, the system 100 may only use a subset of all follower IDs 108 present in the user database 106.

The user profiles 110 may be composed of any and all information about the users in the user database 106 as well as any and all information that can be derived from the information in the user database 106. Such information may include without limitation a user's preferences related to user importance, previous posting patterns, and the IDs of a user's followers.

The follower attributes 112 may be composed of any and all information about followers found or derived from either the user database 106 or the social importance ranking service 104. The follower attributes 112 may include without limitation attributes such as influence score, age, gender, number of posts, likelihood of being a spammer, rate of interaction with the user, an estimation or other measure of the rate at which posts arrive in the follower's feed, and recency of posting time on the social networking site 102, for example.

The custom follower scores 114 may be the scores generated by a follower scoring process 150, which is described further below. The custom follower scores 114 can be used in generating the ideal user post time suggestions 122, as the custom follower scores 114 may represent the importance of the followers. Each follower may have a score, and the scores across all followers may or may not be unique.

A timeline may be characterized as the posts and the times at which they were made by a specific individual. The follower timelines 116 may be the timelines for all of the selected follower IDs 108 processed by a timeline (or "post") collection process 152, as described below. Further, the timestamp database 118 may be a data repository and may store a representation of the times at which followers posted to the social networking site 102. In one embodiment, this representation may be a tuple comprised from the follower ID and the timestamps extracted from the timelines.

Still further, each follower histogram 120 may be a representation of the frequency at which a follower posts to the social networking site 102 for a given time period. The time periods in the histogram 120 may be of equal size. The selected size of the time period can be referred to as the resolution of the histogram 120. Similarly, the length of time covered by the histogram 120 can be referred to as the duration of the histogram 120. One embodiment, for example, may involve a histogram 120 of a 24-hour duration composed of 1440 periods, each representing a one minute span during the course of the 24 hour period. Each of those periods may be associated with a count representing the number of times the user posted to the social networking site 102 during that time period.

The user post time suggestions 122 are the output of the described system 100. The user post time suggestions 122 may be the ideal times at which a user should make a post to the social networking site 102 in order to have maximum impact. These suggestions may take the form of a list of discrete values (times) at which a post should be made as well as a chart, graph, or other representation of the expected impact for every moment over a selected period of time.

FIG. 1 also shows a number of processes that the ideal post time suggestion system 100 utilizes. Through these processes, the ideal post time suggestion system 100 generates, acquires, stores, and/or manipulates the aforementioned types of data. These processes include, for example, a follower attribute extractions process 154, the follower scoring process 150, the post collection process 152, a timestamp extraction process 156, a follower histogram generation process 158, and a custom-weighted aggregation process 160.

In the alternative, the exemplary processes shown in FIG. 1 can also be said to illustrate a method for suggesting ideal post times. To avoid redundancy, however, the processes of FIG. 1 will be described in terms of the system, because one skilled in the art would understand how FIG. 1, its processes, and its corresponding description would be equally applicable to the method for suggesting ideal post times.

As part of the follower attribute extraction process 154, the system 100 may extract, aggregate, or otherwise generate the attributes for a follower. The follower attribute extraction process 154 may rely on the data in the user database 106 as well as any number of social importance ranking services 104, whether external or internal to the system 100.

The follower scoring process 150 may take both a user profile 110 and a set of follower attributes 112 as input. The follower scoring process 150 may calculate the importance of a follower. The importance metric may be defined in the user profile 106. The metric may be user-defined or selected from one or more default metrics provided by the system 100. The scoring function is a function $$f: \text{follower}_{attributes} \rightarrow s \in \mathbb{R}$$

that maps the follower's attribute values to a real valued score s representing the follower's importance. The attributes may be numeric (e.g., number of posts made), categorical (e.g., gender, profession), or combinations thereof. For explanatory purposes, the following is one example of such a scoring function:

$$\text{score(follower)} = \left(\frac{1}{\#\_days\_since\_last\_post + 1}\right)^2 +$$
$$\left(\frac{1}{\#\_days\_since\_interacting + 1}\right)^2 + \left(\frac{1}{101 - \text{influence\_score}}\right)^2 +$$
$$\left(\frac{1}{\text{following\_to\_followers\_ratio}}\right)^{1/2} + (\text{interaction\_rate})$$

In still other embodiments, all followers may be given equal weight.

With regard to the post collection process 152, the system 100 may retrieve the timelines for the inputted list of follower IDs 108 from the social networking site 102. The post collection process 152 may be responsible for accessing the social network 102, scheduling retrieval times, providing login credentials, handling network errors, and otherwise accessing and collecting the timelines for the specified followers. Once follower timelines are gathered, the system 100 may perform the timestamp extraction process 156, where the system 100 can extract timestamps (i.e., when posts occurred) from each follower's timeline. The timestamps and associated follower ID may then be stored in the timestamp database 118 for future use. If necessary to overcome discrepancies between timestamp representations (e.g., different time zones), the system 100 may convert all times to some universal metric (e.g., Greenwich Mean Time) for all followers and timestamps.

During the follower histogram generation process 158, the system 100 may use the data stored in the timestamp database 118 to generate a post time histogram 120 for each follower ID. In one embodiment, the histogram 120 is a representation of when the users are active during a specified time period.

Finally, in the custom-weighted aggregation process 160, which is described in further detail below with regard to FIG. 2, the system 100 may generate suggested ideal post times 122. In short, the system 100 may aggregate the follower post time histograms 120 into a single, comprehensive histogram, subject to multiple transformations and weighting. Initially, each individual histogram 120 may be transformed to represent the time at which the follower is active rather than simply the time at which the follower posted. The user-defined set of modified follower histograms may then be aggregated, subject to the user-defined weighting scheme, into a single histogram. The new histogram may represent the value of posting during the specified time periods. From this histogram, the ideal post times (i.e., the times at which the value is highest) may be extracted and outputted. It should be noted that the output of the custom-weighted aggregation process 160 is not limited to specific post times.

Figure 2:
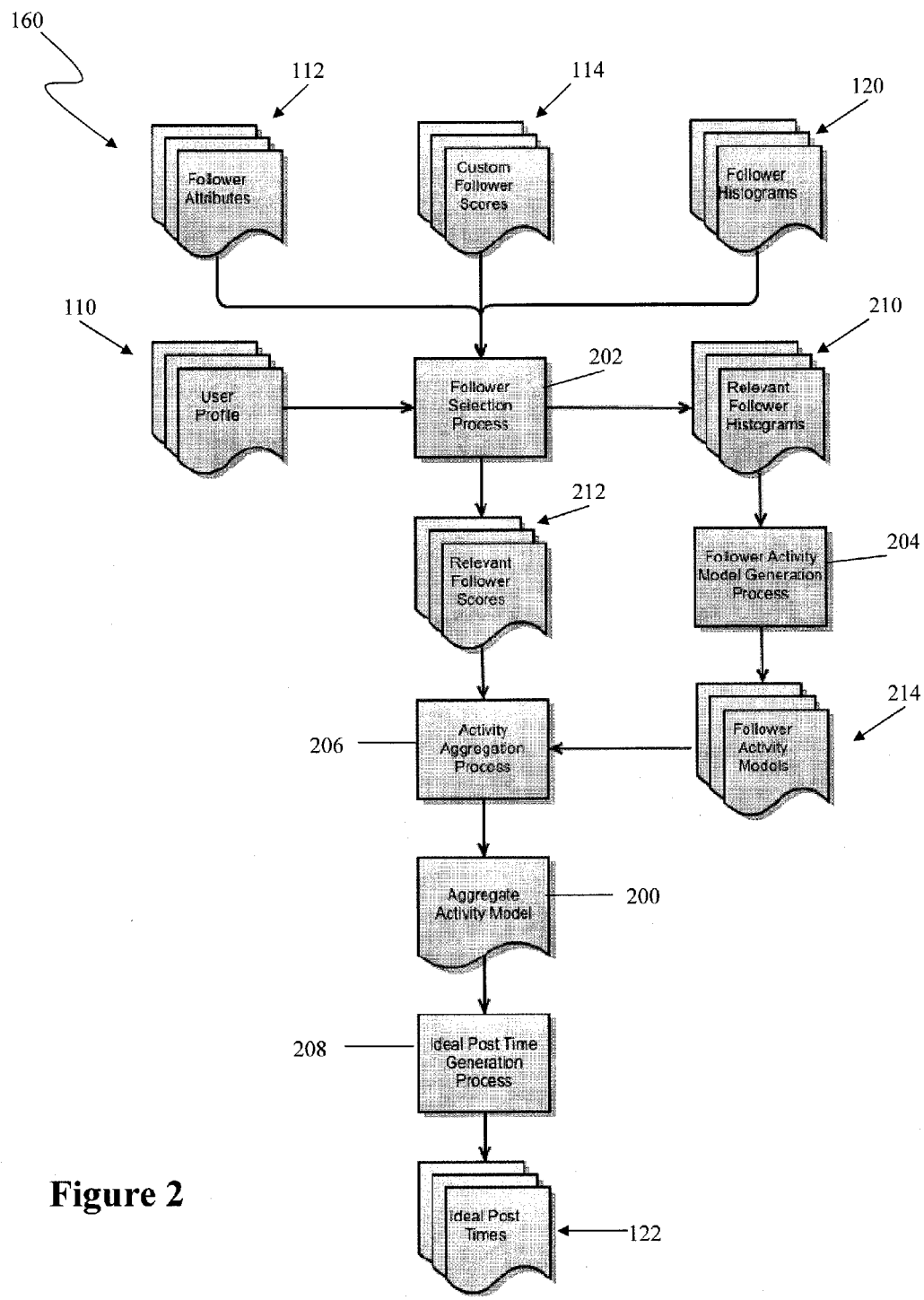
FIG. 2 is a schematic illustration of a custom-weighted aggregation process used in the ideal post time suggestion system shown in FIG. 1.

As shown in FIG. 2, the custom-weighted aggregation process 160 may be the most complex process in the ideal post time suggestion system 100. The custom-weighted aggregation process 160 may be responsible for transforming and aggregating individual follower posting patterns (e.g., histograms 120) into an activity model 200 that is used to suggest ideal post times 122. The inputs may include, for example, the customer follower attributes 112, the follower scores 114, the follower histograms 120, and the user profile 110, as described above. The output of the custom-weighted aggregation process 160 may include, for example, the list of ideal post times 122. Moreover, the custom-weighted aggregation process 160 may itself be described in terms of several processes, such as a follower selection process 202, a follower activity model generation process 204, an activity aggregation process 206, and an ideal post time generation process 208.

For example, the follower selection process 202 may be responsible for selecting the appropriate follower scores 114 and histograms 120 with regard to constraints specified in the user profile 110. A constraint specification, for example, may be a set of constraints over the follower attributes 112. The set of constraints may be empty (i.e., use all followers), minimal (e.g., exclude only followers who have high probability of being spammers), or arbitrarily complex (e.g., only include followers who have interacted within the previous 30 days, are men aged 18-35, and reside within the eastern portion of the United States). As shown through the example, it should be understood that combinations of these constraints may be employed as well. Other constraints allow the user to distinguish ideal post times for weekdays, weekends, holidays, and so on, for example. Still other merely exemplary constraints that may be used to hone ideal post times include tallying only those posts that are "liked" or re-tweeted, for example. Another constraint may be based on a user-defined window of follower history (e.g., going back 2 weeks, 3 months, 1 year; all data from numerous years during the 2 weeks leading up to Black Friday; the last 100 user posts). Yet another constraint focuses on the number of users, which can be represented as an exact value (e.g., use 4,000 people) or a range (e.g., use at least 250 people but not more than 2,000). Another constraint may involve only using data from followers that use social media with some measure of regularity.

That said, the follower selection process 202 may select the follower histograms 120 and custom follower scores 114 meeting the constraints from the input, and output the relevant data for use in the next process. In the embodiment shown in FIG. 2, the follower selection process 202 may output relevant follower histograms 210 and relevant follower scores 212 based on the constraints.

Although in this embodiment the constraints are placed on the follower attributes, the present disclosure contemplates that the constraints may be placed on other input, or on combinations of input.

Next, the follower activity model generation process 204 may transform the relevant follower post time histograms 210 into a model 214 of their activity. A follower's activity may be defined as the period(s) of time at which the follower is online and likely to see a post in his or her feed. The follower may be said to be likely to see a post in his or her feed if the post was made within the last m minutes. For purposes of this example, this value m may be referred to as the follower's post time window. Social networking sites do not provide information on what the value of m should be. Therefore, it may be necessary to use a function based on the known follower attributes 112 to predict the ideal value of m. The function $$f: follower_{attributes} \rightarrow m \in \mathbb{R}+$$

maps the follower's attribute values to some positive real value m, where m is the follower's post time window. To illustrate, the window size could be predicted using a linear function on the number of people the follower is following, for example:

$$m = \frac{.3 \times f}{60},$$

where f is the number of people the follower is following.

After the activity model generation process 204 has determined a follower's post time window, the post time histogram may be transformed into an activity model 214. Each entry in the histogram may be expanded to the width of the post time window, centered at the original post time. For example, if the system 100 was using a histogram resolution of one minute and duration of twenty-four hours and a follower had made a post at time 8:10 P.M., a "bin" corresponding to 8:10 P.M. would contain the value one. If the follower had a post time window of nine minutes, the activity model would modify the values in the bins corresponding to times 8:06 to 8:14 to be one. This example is only for illustrative purposes and is not indicative of the actual follower post times, follower window, histogram duration, or histogram resolution used in the actual system. And further, the bin(s) need not necessarily be increased by just one. For instance, the bin(s) may be incremented by any value, such as a numeric derived from a custom follower score and the size of the post time window m. At any rate, the output of the activity model generation process 204 may be the activity model 214 for each of the inputted relevant followers.

Using the follower activity models 214 and the relevant follower scores 212, the system 100 may perform an activity aggregation process 206. The activity aggregation process 206 may utilize an intelligent aggregation algorithm to combine the individual follower activity models 214 into the single aggregate activity model 200 for the user's entire follower-base. This can occur in two primary steps: aggregation and smoothing.

The aggregation process 206 may generate the aggregate activity model that is the weighted sum of all of the individual follower models 214. The weighting of individual follower models 214 may be determined by the custom follower scores 212. Each follower, or follower post, may be assigned a weight based on the follower scores 212. Each value in the follower activity model 214 may be multiplied, or otherwise modified, by the weight and then added to the new activity model 200. Thus, more importance may be assigned to followers who have higher scores.

Further, the output of the aggregation process 206 may be noisy as the result of (1) having only a timeline's worth of posts per follower, (2) the fact that there are relatively few posts per minute, and (3) the very fine resolution of the model. Noise may be seen, for example, where activity values for adjacent time periods differ significantly, while still following a very clear trend. To overcome the noise, a smoothing algorithm may be applied. Any arbitrary signal smoothing algorithm may be used for this purpose, so long as it is capable of handling a signal that wraps (i.e., the end and the beginning of the signal are adjacent—11:59 P.M. precedes 12:00 A.M., for example). For illustrative purposes, one such algorithm is a modified Gaussian smoothing algorithm. The output of the smoothing process is a low noise representation of the follower-base activity model.

As described above, the aggregate activity model 200 may be the output of the activity aggregation process 206. The aggregate activity model 200 models the level of activity of the followers for every period of time throughout the defined duration. More generally, the activity level at a time can be considered the value of posting a message at that time.

What's more, the custom-weighted aggregation process 160 may also involve an ideal post time generation process 208 in which ideal post times are suggested to a user. The ideal post time generation process 208 may extract the ideal times for a message to be posted. The output 122 of the ideal post time generation process 208 may be a list of times or the aggregate activity model 200 itself. The list of ideal times may be selected in order to maximize the value of each post time as well as ensure that no two post times are too close to one another. Both the number of post times to be suggested and the minimum time between posts may be specified by the user. The user may also specify that the list of ideal post times be limited to a certain time of day (e.g., extract ideal post times between 8 A.M. and 5 P.M.).

One such exemplary method to generate the ideal post times 122 is to sort all of the time periods by their values in descending order and select the first n values (the first being the largest) while skipping values that fall at times less than the minimum gap from any of the previously selected times. Moreover, the value of post times may be scaled to an arbitrary range (e.g., 1 to 100) while maintaining the relative importance of individual times.

The ideal post time suggestions 122 are the output of the ideal post time generation process, and the final result returned to the user. The system may routinely regenerate ideal post times based on new data. On the other hand, the system may be programmed such that it only regenerates ideal post times at the user's request or at specific periods that a user may configure.

Still another aspect of the system concerns the ability for users to post the same message to more than one social network—through a single posting action. The message that is distributed to each social network can be adapted for one or more of the social networks depending on the capabilities and/or limitations of those networks. For example, a message intended for TWITTER may have an image attached to the message. With a message intended for FACEBOOK, for example, the user could shorten hyperlinks and add meta-information within the shortened hyperlink. The meta-information may include a title, a description, and a thumbnail of an image, for example. The user can employ combinations of these features as well. These and other features account for the unique capabilities and limitations associated with each social network. Thus, users can maximize their content while posting to many social networks, all through a single posting action.

Another aspect of the system allows users to schedule posts ahead of time. Users commonly have content for posts in mind before they wish for it to be posted. For example, a user may know exactly what he or she wants to post a month before an event, but the user may wish to post that content not more than a week before the event. The system, therefore, allows the user to schedule one or more dates and times for specific messages to be posted. The user can choose ideal post times from any number of days and times, or the user can prompt the system to choose the most ideal post time on a given day.

Some content may not need to be sent at specific times, but is still desirably posted automatically in the future. As messages come to mind, the user may easily add them to a queue in the system for future posting. Users may choose how many of such automated messages are sent per day. On the other hand, users may also identify times they wish for messages to be sent.

Moreover, users may arrange the queue of messages per a desired send order. Conversely, in another mode, the message to be posted may be selected from the queue randomly.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A system for a user of a social networking site, the system generating at least one of ideal post time suggestions and values associated with the ideal post time suggestions, the system comprising:

a user database for storing information about the user and information about followers that follow activity of the user on the social networking site;

a timestamp database for storing times at which the followers post to the social networking site; and a computer for generating the ideal post time suggestions for the user, wherein the computer calculates the ideal post time suggestions by acquiring follower attributes, computing and assigning a score to each of the followers based on the follower attributes and the information in the user database, generating activity models for each of the followers based on times in the timestamp database, weighting the activity models based on the score assigned to each of the followers, and aggregating the weighted activity models of the followers.

2. The system of claim 1 wherein the follower attributes are acquired from at least one of a social importance ranking service or sources of data having information about the followers.

3. The system of claim 2 wherein the computer smoothes the activity models by applying a smoothing algorithm.

4. A method for generating ideal post time suggestions for a user of a social networking site, the method comprising:

acquiring attributes of followers that follow the activity of the user on the social networking site;

collecting timelines for each of the followers according to an available sequence of follower posts and times of those posts;

computing and assigning a score to each of the followers based on user interests and the follower attributes;

generating activity models for each of the followers based on the timelines;

weighting the activity models based on the score assigned to each of the followers; and aggregating the weighted activity models of the followers.

* * * * *